Figure 1:
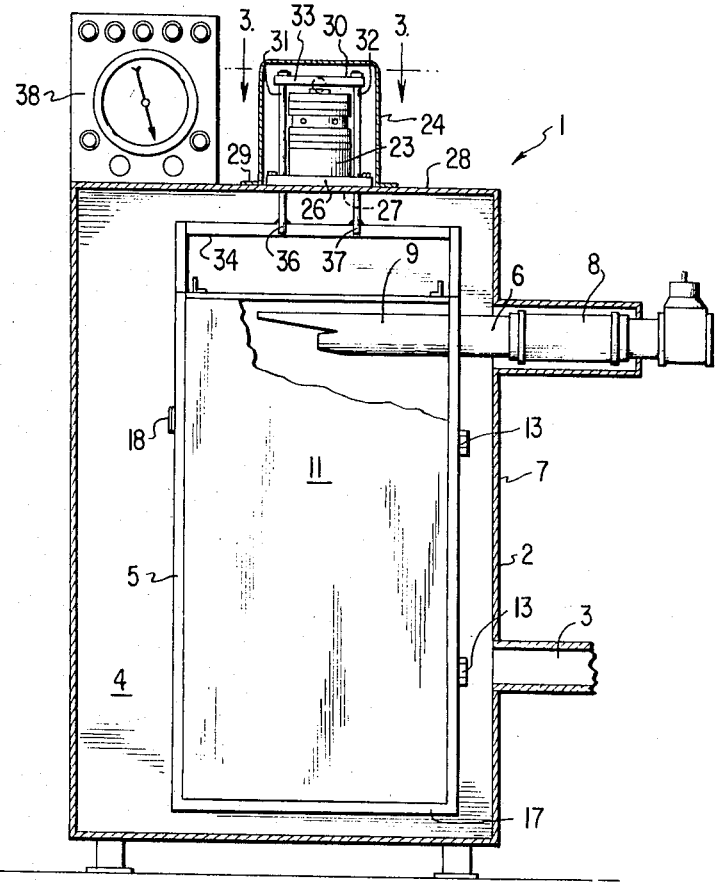

United States Patent

[11] 3,542,091

| [72] | Inventor | Clarence F. Carter<br>Danville, Illinois |
|---|---|---|
| [21] | Appl. No. | 721,871 |
| [22] | Filed | April 16, 1968 |
| [45] | Patented | Oct. 24, 1970 |
| [73] | Assignee | Cater Engineering Company<br>Danville, Illinois<br>a corporation of Illinois |

[54] APPARATUS FOR FILLING CONTAINERS IN A VACUUM ENVIRONMENT
4 Claims, 4 Drawing Figs.

[52] U.S. Cl. .................................................. 141/65,
141/68, 141/83, 141/314, 177/208, 177/238
[51] Int. Cl. .................................................. B65b 3/04
[50] Field of Search .................................................. 141/51, 10,
65, 67, 68, 83, 313—317; 177/180—182, 208,
209, 238

[56] References Cited
UNITED STATES PATENTS

| 2,765,816 | 10/1956 | Carter | 141/51X |
| 2,799,465 | 7/1957 | Carter | 141/10X |
| 3,147,616 | 9/1964 | Rome | 177/208X |
| 3,371,732 | 3/1968 | Stein | 177/208 |

*Primary Examiner*—Laverne D. Geiger
*Assistant Examiner*—Edward J. Earls
*Attorney*—Burns, Doane, Benedict, Swecker and Mathis ABSTRACT: A weighing and filling apparatus including a housing, a weighing cage suspended within the housing from a pneumatic load cell, means for generating a vacuum within the housing, and means for conveying particulate material to a container supported by the weighing cage. The pneumatic load cell includes a flexible seal exposed to the vacuum environment within the housing and additional diaphragm means exposed to the vacuum and operable to nullify vacuum generated forces acting on the pneumatic load cell.

Patented Nov. 24, 1970

3,542,091

Sheet 1 of 2

INVENTOR
CLARENCE F. CARTER

BY Burns, Doane, Benedict, Swecker & Mathis
ATTORNEYS.

INVENTOR
CLARENCE F. CARTER

3,542,091

APPARATUS FOR FILLING CONTAINERS IN A VACUUM ENVIRONMENT

BACKGROUND, GENERAL OBJECTS AND SUMMARY OF INVENTION

For some time the advantages of filling containers in a vacuum environment has been recognized. A pioneer contribution in this art is evidenced by a U.S. Carter Pat. No. 2,765,816.

The apparatus featured in this Carter Patent is characterized by a weighing cage supported by a linkage which extends through a bellows seal to a beamtype weighing device mounted externally of the housing.

The advantages of this unit notwithstanding, certain problems are presented by employing mechanical force transmitting means to pass through the housing wall to an external weighing device. For example, special seals are required where the mechanical linkage intersects the housing. Such seals, even though small, engender weighing errors in that they are acted upon by a vacuum environment within the housing.

While compensation can be made for the vacuum effect, it would be desirable to altogether eliminate the effect of vacuum on the weighing operation.

Other problems are often involved in the handling of powder materials which are flammable or explosive in character because of their finely divided nature. Electrical control circuits in the vicinity of an apparatus effecting the filling of a container with such material might constitute a safety hazard in that is would introduce the possibility of sparking which could ignite the finely divided material.

Because of the environmental conditions surrounding the weighing and filling operations, and because unskilled personnel are often involved in the handling of filling apparatus, it would be desirable to fully shield a weighing apparatus incorporated with a filling mechanism.

It thus is an object of the invention to provide an apparatus for filling a container in a vacuum environment while ensuring that the vacuum does not deleteriously affect the weighing of a container being filled.

It is likewise an object of the invention to positively protect and shield a weighing mechanism incorporated in a filling system by fully housing the weighing mechanism within the filling unit interior.

Another object of the invention is to provide a pneumatic or fluid responsive weighing unit lacking altogether the seal problems associated with mechanical or beamtype weighing units and lacking altogether the safety problems engendered by electrical weighing units.

In a seemingly contradictory manner, it is an object of the invention to incorporate such a fluid responsive weighing system in an environment where the weighing mechanism is acted upon by external forces generated by a vacuum, which forces are not related to the weighing operation.

In accomplishing at least some of the foregoing objects, there is presented through the invention an apparatus which includes housing means and first conduit means operable to create a vacuum within the interior of the housing means. A container supporting means, i.e., weighing cage, is disposed within the housing means. A nozzle means projects through a wall portion of the housing means and includes second conduit means operable to convey particulate material to a container supported by the container supporting means. A container weighing means is included in the apparatus in combination with a shroud means which defines a portion of the housing means and encloses the weighing means within the housing means interior.

A force transmitting means extends from the container supporting means to the weighing means and is operable to transmit the weight of the container supporting means and a container supported thereon to the weighing means. Fluid reaction surface means are operable to generate oppositely directed forces acting on the force transmitting means to nullify the effect of a vacuum environment in the interior of the housing means on the weighing means.

DRAWINGS

In describing the invention, reference will be made to a preferred embodiment shown in the appended drawings.

Figure 2:
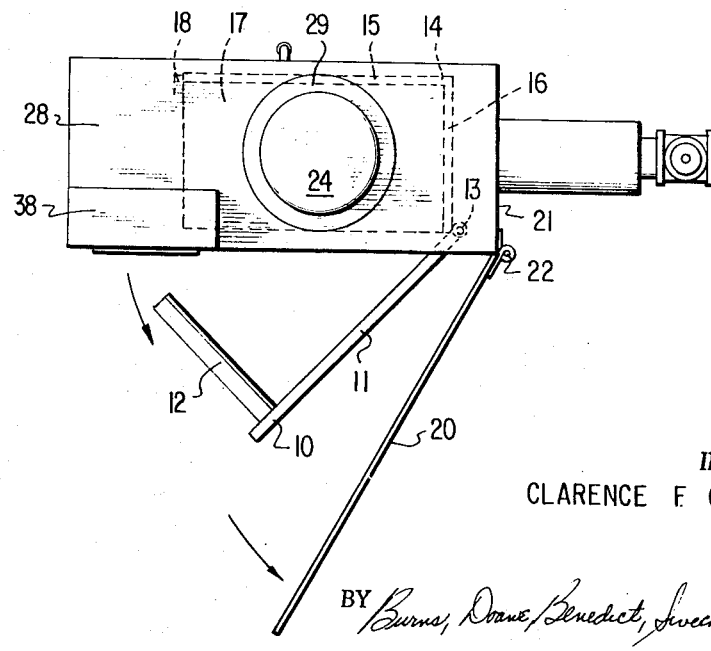
Figure 3:
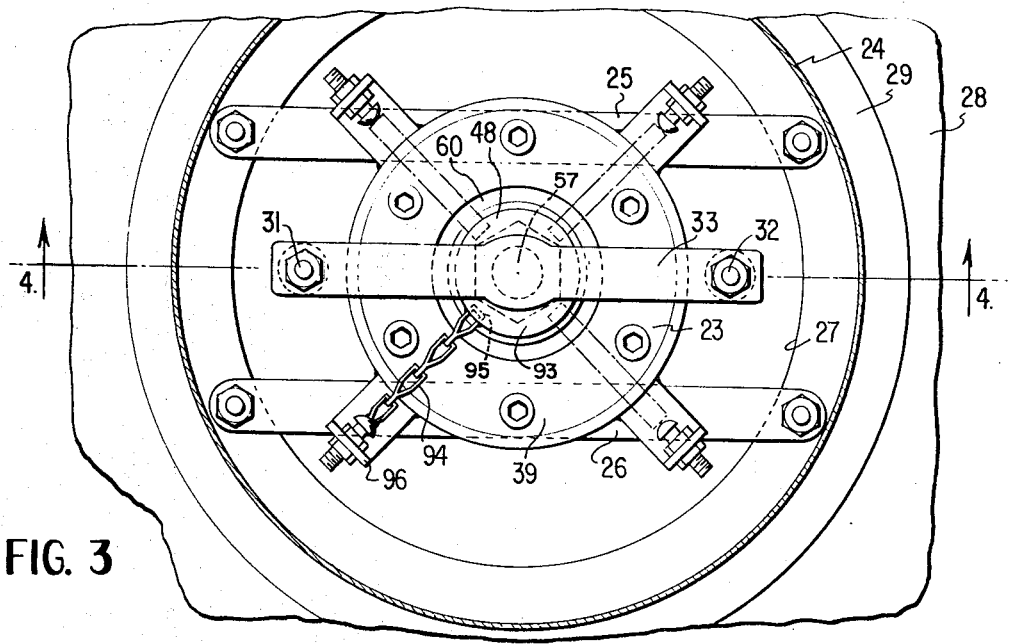
Figure 4:
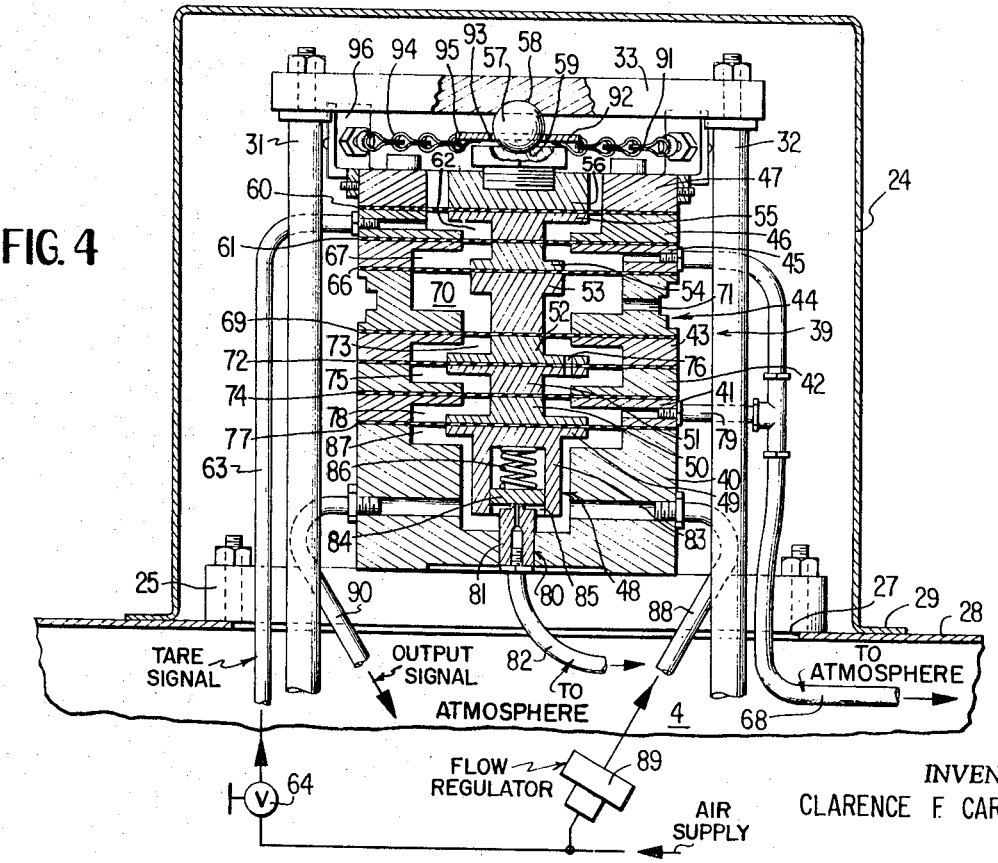

In the drawings:

FIG. 1 provides a fragmentary, vertically sectioned, elevational view of a weighing device of the present invention illustrating structural details existing between a filling nozzle, a weighing cage, a vacuum environment and a pneumatic weighing cell;

FIG. 2 provides a top plan view of the FIG. 1 assembly illustrating a housing door opened and a weighing cage door opened to facilitate the installation of a container in the cage for filling purposes;

FIG. 3 provides a sectioned, top plan view of the pneumatic load cell incorporated in the FIG. 1 apparatus; and FIG. 4 provides a vertically sectioned, elevational view of the pneumatic load cell as viewed along the section line 4-4 of FIG. 3.

PRINCIPAL COMPONENTS OF APPARATUS

FIGS. 1 and 2 illustrate principal components of a weighing and filling apparatus 1.

Apparatus 1 includes a cabinetlike housing 2. A conduit 3 extends from housing 2 to a vacuum pump, not shown. Conduit 3 thus serves as a vehicle for withdrawing air from the interior 4 of housing 2 so as to produce a vacuum in this housing cavity 4.

A cagelike, bag container 5 is supported for vertical weighing movement within the housing cavity 4. A material supplying nozzle 6 projects through a wall 7 of the housing 2. Nozzle 6 serves to convey particulate or powered material into an upper corner of a bag supported by the weighing cage 5. A flexible coupling 8 allows the nozzle tip 9 to undergo vertical movement with the weighing cage 5 and a container supported thereby without adversely affecting the weighing operation.

Structural details of the nozzle 6 and flexible connection 8, as well as detailed considerations of the manner in which these mechanisms serve to supply particulate material to a container within the cage 5 are set forth in the aforesaid U.S. Carter Pat. No. 2,765,816.

In this connection, reference may be made to FIG. 2 in order to obtain a better understanding as to how a container to be filled is loaded within the cage 5. Cage 5 includes an L-shaped assembly 10 including a front wall 11 and a left side wall 12. A pivot connection 13 joins this door unit 10 to the remainder or body 14 of the cage 5. Body 14 includes a rear wall 15, a right side wall 16, and a base 17. A latch 18 serves to detachably secure the left wall 12 to the rear wall 15.

As is also shown in FIG. 2, housing 2 includes a front door 20 supported on the right cabinet wall 21 by a pivot mounting 22.

By opening the cabinet door 20, and pivoting the cage door 10 outwardly, a bag may be moved into the interior of the cage 5 with the nozzle end 9 received within the upper right corner of the bag. The cage door 10 is then closed and latched, following which the cabinet door is closed and latched. Thereafter a vacuum is induced in the cabinet interior 4 by means of withdrawing air through the conduit 3. Particulate material may be then conveyed into the bag through the nozzle 6.

The vacuum within the interior zone 4 facilitates the filling operation by removing air which might tend to make it difficult to obtain a dense packing of material within the container being filled. The vacuum also serves to hold the sides of the container outwardly so as to promote full filling.

As will be appreciated, the cage 5 and cabinet 2 have been shown more or less schematically. Specific details of the cabinet 2 are set forth in the aforesaid Carter Patent. The cage 5, although similar to that featured in the Carter Patent, is preferably modified by the addition of planar side walls which are adjustably mounted so as to be able to conform to the sides of the container being filled. The adjustable wall features of this cage are described in greater detail in my pending application Ser. No. 549,709, filed May 12, 1966, now U.S. Pat. No. 3,430,720 and entitled, "Methods and Apparatus for Weighing Material in Vacuum Enviornment".

Apparatus 1 further includes a pneumatic weighing cell 23. A cylindrical shroud 24 covers the weighing cell 23 and, in essence, defines a continuation of the housing 2. As will be apparent, with reference to FIGS. 1, 3 and 4, cell 23 is supported on brackets 25 and 26 which extend across an aperture 27 in the upper housing wall 28. Thus, load cell 23 is disposed in fluid communicating relation with the interior zone 4 by way of the aperture 27.

The shroud rim 29 is detachably secured to the wall 28 by conventional threaded fasteners and gasket means, not shown.

A force transmitting bracket 30 interconnects the cage 5 with the load cell 23. Bracket 30 includes a pair of vertically extending side legs 31 and 32. A horizontally extending top beam 33 interconnects the side legs 31 and 32 and passes across the top of the load cell. Top member 33 is operable to transmit the weight of the cage 5 and a container being filled to the load cell 23.

As illustrated, bracket legs 31 and 32 are connected to a top strut 34 of the cage body 14. The connecting points 36 and 37 between these legs and the strut are centrally and symmetrically located with respect to the closed cage 5 so as to provide a symmetrical and uniform transmission of load from the cage 5 to the bracket member 33.

A pneumatic signal generated by the load cell 23, which is directly proportional to the weight of the container being filled within the cage 5, is transmitted to a conventional recording and indicating mechanism 38.

Thus, as a container within the cage 5 is being filled by the nozzle 6, the corresponding weight of the cage 5 is transmitted through the bracket 30 to the weighing cell 23. A pneumatic pressure signal generated within the load cell 23 is proportional to the weight of the container being filled and is transmitted to the indicator 38. Thus, an operator can determine the amount of material which has been supplied to the container.

Conventional control means may extend from the indicator 38 to effect the automatic termination of filling, once a required container weight has been achieved.

As will be noted, the load cell 23 is entirely enclosed within the interior 4 of the cabinet 2. Within the interior of the cabinet there are no electrical components which would engender any safety hazards. None of the force transmitting mechanisms operable to transmit the weight of the cage 5 to the load cell 23 are affected by vacuum conditions within the cabinet interior 4. Since none of the force transmitting linkages pass through the housing wall, no special seals are required.

DETAILS OF PNEUMATIC WEIGHING CELL

FIG. 4 illustrates structural details of the pneumatic cell 23. Load cell 23 includes generally cylindrical enclosure means 39 defined by a series of stacked, generally annular segments 40, 41, 42, 43, 44, 45, 46 and 47.

A force transmitting rod means 48 is mounted for limited force transmitting, vertical movement within the interior of the enclosure 39. Rod means 48 is comprised of a series of stacked rod segments 49, 50, 51, 52, 53, 54, 55 and 56.

A spherical ball bearing 57 provides a force transmitting mechanism between the bracket beam 33 and the upper end 56 of the rod means 48. As illustrated, ball bearing 57 is received within a conforming ball seat 58 formed in the underside of the member 33 and a conforming ball seat 59 mounted in the top portion of the upper rod member 56.

Load cell 23 includes a series of annular diaphragms extending between the rod means 48 and the enclosure means 39. All of these diaphragms are flexible and may be fabricated of elastomeric or thin, metallic material. The diaphragms extend between the various enclosure and rod means segments, as illustrated. The interleaved diaphragms, enclosure segments, and rod means segments are interconnected by conventional fastener means (not shown) which pass vertically through the stacked elements.

The uppermost or first diaphragm 60 defines a flexible closure for the upper end of the weighing cell 23.

A second diaphragm 61 is disposed axially beneath diaphragm 60 so as to define a first cavity 62. The areal extent of diaphragm 61 is less than that of diaphragm 60.

A conduit 63 serves to provide controlled pressurized air to the first cavity 62. The pressure of air fed through the conduit 63 may be regulated by a conventional pressure regulator 64. This regulated pressure supplied to the cavity 62, because of the difference in area of diaphragms 60 and 61, provides a net, upwardly biasing force, transmitted through the diaphragm 60 and 61 to the rod means 48. This force is calibrated by controlling the applied fluid pressure so as to offset the tare weight of the apparatus, i.e., to offset or compensate for the weight of the cage 5, etc.

A third diaphragm 66 is disposed axially beneath the diaphragm 61 so as to define a second cavity 67. Cavity 67 communicates with the atmosphere external of the housing 2 by way of the conduit 68.

A fourth diaphragm 69 is spaced axially beneath the diaphragm 66 so as to define a third chamber 70. Chamber 70 is disposed in direct communicating relation with the vacuum environment, created in the housing cavity 4, by way of one or more ports 71 formed in the segments 44.

The areal extent of the diaphragm 66 exceeds that of diaphragm 69. The difference of the effective areal extent of the diaphragms 66 and 69, including portions overlapped by fluid responsive rod segment portions, is equal to the effective areal extent of the diaphragm 60. Thus, vacuum acting on the diaphragms 66 and 69 within the cavity 70 imposes a net downward force on the rod means 48 which is exactly equal to the net upward force imposed by this vacuum on the rod means 48, as transmitted through the diaphragm 60. In this manner, the vacuum induced force acting on the upper side of the diaphragm 60 is nullified.

A fifth diaphragm 72 is disposed axially beneath the diaphragm 69 so as to define a fourth cavity 73. A sixth diaphragm 74 is disposed beneath the diaphragm 72 so as to define a fifth cavity 75. Restricted port means 76 intersects the diaphragm 72 and flange portions of the segments 51 and 52 so as to provide limited communication between the cavities 75 and 73. These cavities 73 and 75 are filled with oil. Thus, the port 76 allows the diaphragm 72 to undergo dampened movement within the cavities 73 and 75. This dampening stabilizes the weighing movements of the rod means 48.

A seventh diaphragm 77 is disposed axially beneath the diaphragm 74 so as to define sixth cavity 78. Cavity 78 communicates with the atmosphere by way of conduit 79 which branches laterally from conduit 68.

A lower end wall 80 forms the base of th enclosure 39. An orifice 81 is centrally located in this wall means 80. A conduit 2 provides fluid communication between the orifice 81 and the atmosphere external of the housing 82. An orifice flow controlling assembly 83 is carried by the segment 49. This flow controlling unit 83 comprises a plate 84 supported on a rim 85 and biased downwardly by a coil spring 86. With this arrangement, the plate 84 is operable to close the orifice 81, with the rod means 48 being able to move downwardly even after the port closing has been effected.

Wall means 80 and diaphragm 77 define a seventh cavity 87. A conduit 88 serves to supply pressurized air to the cavity 87 under the controlling influence of the conventional pressure and constant flow regulator 89. In this manner, a constant feed of regulated pressure air is supplied to the cavity 87. A conduit 90 provides a outflow path from the cavity 87, leading to a conventional pressure recording component of the mechanism 38.

As will be appreciated, when a load is imposed on the beam 33 by the cage 5 and a container being filled, the rod means 48 will be depressed so as to cause the plate 84 to close the orifice 81. This will cause pressure to build up within the cavity 87 to a point sufficient to overcome the load force acting on the load means 48 which induced its depression. This pressure increase will be transmitted through the conduit 90 to the recorder 38. The magnitude of the pressure increase will be directly proportional to the weight of the container being filled. In this connection, it will be appreciated that the tare weight of the cage 5 and the vacuum forces acting on the load cell 23 have been effectively nullified so as to ensure this proportional function of the air pressure within the chamber 87.

As will be understood, once the pressure 87 has reached a level sufficient to balance the load imposed on the load means 48, the rod means 48 will move upwardly sufficiently to enable bleeding to take place from the cavity 87 through the conduit 82. This bleeding will enable the signal pressure to stabilize within the chamber 87 at a level proportional to the applied load.

During filling operations, it is possible that particulate material may impose a nonsymmetrical load on the cage 5. In order to ensure that this nonsymmetrical load is transmitted axially and centrally to the rod means 48, a centering or restraining mechanism 91 is provided. Centering mechanism 91 comprises an annular washer 92 which peripherally encircles the ball 57. The central aperture 93 of the washer 92 slightly exceeds the diameter of the ball 57 so as to provide lateral restraint of the ball 57 while allowing vertical ball movement to take place in accordance with loads acting on the beam 33.

Restraining washer 92 is held in space in such a manner as not to impose any load on the rod means 48. This suspension is achieved by a series of chains 94 which are connected to the periphery of the washer 92 at a connecting point 95. Each chain 94 extends horizontally outwardly to a bracket mounting 96 at the rim 47 of the enclosure means 39.

SUMMARY OF ADVANTAGES AND SCOPE OF INVENTION

A principal advantage of the apparatus resides in the concept of completely enclosing a weighing means within a vacuum filling apparatus. This complete enclosure protects the weighing means from damage and adverse environmental conditions and shields and load cell from improper handling.

Through the unique diaphragm arrangement, which nullifies vacuum forces acting on the rod means 48, the weighing cell is able to accurately perform its weighing function without being affected by vacuum conditions.

This unobvious and unique utilization of a pneumatic weighing cell in a vacuum environment affords the advantage of completely avoiding the safety problems which would be engendered by electrical weighing units and completely avoiding the seal problems which would be associated with mechanical weighing units.

In describing the invention, reference has been made to a preferred embodiment. However, those skilled in the vacuum filling art may envision additions, deletions, substitutions or other modifications which would fall within the purview of the invention as set forth in the appended claims.

I claim:

1. An apparatus for filling containers with particulate material in a vacuum environment said apparatus comprising:
 housing means;
 first conduit means operable to withdraw air from the interior of said housing means;
 container supporting means disposed within said housing means;
 nozzle means projecting through a wall portion of said housing means from the exterior of the housing means into the interior thereof, said nozzle means including second conduit means operable to convey particulate material to a container supported by said container supporting means;
 container weighing means;
 shroud means having an interior communicating with the interior of said housing means so as to define a portion thereof, and enclosing said weighing means within the interior of said housing means;
 force transmitting means extending from said container supporting means to said weighing means and operable to transmit the weight of said container supporting means and a container supported thereon to said weighing means; and
 fluid reaction surface means carried by said force transmitting means and operable to generate oppositely directed forces acting on said force transmitting means to nullify the effect of a vacuum environment in the interior of said housing means on said weighing means.

2. An apparatus for filling containers with particulate material in a vacuum environment, said apparatus comprising:
 housing means;
 first conduit means operable to withdraw air from the interior of said housing means;
 container supporting means disposed within said housing means;
 nozzle means projecting through a wall portion of said housing means from the exterior of the housing means into the interior thereof, said nozzle means including second conduit means operable to convey particulate material to a container supported by said container supporting means;
 container weighing means;
 shroud means having an interior communicating with the interior of said housing means so as to define a portion thereof, and enclosing said weighing means within the interior of said housing means;
 force transmitting means extending from said container supporting means to said weighing means and operable to transmit the weight of said container supporting means and a container supported thereon to said weighing means;
 said weighing means including:
  first, fluid reaction surface means connected with said force transmitting means and exposed to a vacuum created within the interior of said housing means by the withdrawal of air through said first conduit means; and
  second, fluid reaction surface means connected with said force transmitting means, said second fluid reaction surface means being exposed to said vacuum and operable to impose a vacuum induced force on said force transmitting means opposite to a force imposed on said first, fluid reaction surface means by said vacuum;
 said first fluid reaction surface means providing a flexible closure for a portion of said weighing means, with said closure being exposed to said vacuum.

3. An apparatus for filling containers with particulate material in a vacuum environment, said apparatus comprising:
 housing means;
 first conduit means operable to withdraw air from the interior of said housing means;
 container supporting means disposed within said housing means;
 nozzle means projecting through a wall portion of said housing means from the exterior of the housing means into the interior thereof, said nozzle means including second conduit means operable to convey particulate material to a container supported by said container supporting means;
 cylindrical shroud means having an interior communicating with the interior of said housing means and defining a detachable portion thereof;
 generally cylindrical enclosure means mounted on an upper portion of the interior of said housing means;
 a generally U-shaped bracket having:
  a pair of legs passing vertically along opposite sides of said enclosure and connected with said container supporting means; and
  a horizontally extending end member connecting said legs and passing over the top of said enclosure;

force transmitting rod means positioned within said enclosure means for limited vertical movement;

force transmitting means between said horizontally extending end member of said U-shaped bracket and said rod means and including a spherical ball interposed axially between said end member and said rod means;

first, annular diaphragm means extending between said rod means and said enclosure means, said first diaphragm means defining a flexible closure for the upper end of said enclosure exposed to a vacuum environment within the interior of said housing means;

second, annular diaphragm means extending between said rod means and said enclosure means and having a cross-sectional area less than that of said first diaphragm means, said second diaphragm means being located beneath said first diaphragm means;

first cavity means disposed axially between said first and second diaphragm means;

means operable to supply fluid pressure to said first cavity means, with said fluid pressure acting on said first and second diaphragm means to cause said first and second diaphragm means to exert a net lifting force on said rod means to compensate for the weight of said container supporting means;

third, annular diaphragm means extending between said rod means and said enclosure means and disposed axially beneath said second diaphragm means;

second cavity means interposed between said second and third diaphragm means;

third conduit means providing fluid communication between the atmosphere external of said housing means and said second cavity means;

fourth, annular diaphragm means extending between said rod means and said enclosure means and disposed beneath said third diaphragm means;

third cavity means interposed axially between said third and fourth diaphragm means, said third cavity means being disposed in fluid communicating relation with the interior of said housing means;

said fourth diaphragm means having an area less than that of said third diaphragm means, with the difference in area between said third and fourth diaphragm means being equal to the effective area of said first diaphragm means to cause vacuum within the interior of said housing means acting on said first diaphragm means to produce a force acting on said rod means opposite to the net vacuum-induced force imposed on said rod means by said third and fourth diaphragm means;

fifth, annular diaphragm means extending between said rod means and said enclosure means and disposed axially beneath said fourth diaphragm means;

fourth cavity means interposed axially between said fourth and fifth diaphragm means;

sixth, annular diaphragm means extending between said rod means and said enclosure means and located axially beneath said fifth diaphragm means;

fifth cavity means interposed axially between said fifth and sixth diaphragm means;

restricted port means providing limited fluid communication between said fourth and fifth cavity means so as to permit motion dampening movement of said fifth diaphragm within said fourth and fifth cavity means;

seventh, annular diaphragm means extending between said rod means and said enclosure means and disposed axially beneath said sixth diaphragm means;

sixth cavity means interposed axially between said sixth and seventh diaphragm means;

fourth conduit means providing fluid communication between said sixth cavity means and the atmosphere external of said housing means;

wall means defining the lower end of said enclosure means, said wall means being spaced beneath said seventh diaphragm means;

seventh cavity means interposed axially between said seventh diaphragm means and said wall means;

orifice means mounted in said wall means;

orifice restricting means carried by said seventh diaphragm means and operable to vary flow through said orifice means in response to axial movement of said rod means;

means operable to supply regulated fluid pressure to said seventh cavity means;

fifth conduit means operable to discharge fluid from said seventh cavity means through said orifice means and to the atmosphere external of said housing; and signal conduit means operable to transmit the pressure of fluid within said seventh cavity means to pressure measuring means.

4. An apparatus as described in claim 3 including force transmission stabilizing means comprising:

annular constraining means horizontally encircling said spherical ball and disposed in vertical telescoping relationship with said ball so as to allow said ball to move vertically relative to said annular constraining means; and a plurality of linkage means radiating outwardly from said constraining means and operable to support said constraining means from peripheral portions of said enclosure means.